Aug. 13, 1935.    C. H. EASTMAN    2,011,476
AUTOMATIC FLUID CONTROL AND VACUUM DEVICE
Filed Sept. 12, 1933    2 Sheets-Sheet 2
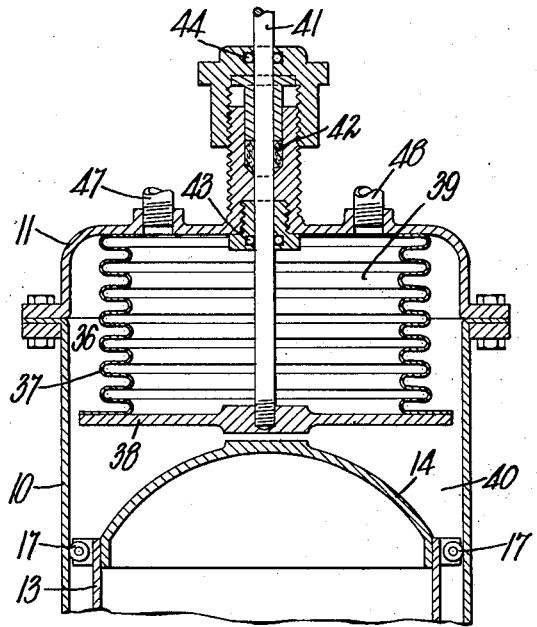
Fig. 2.
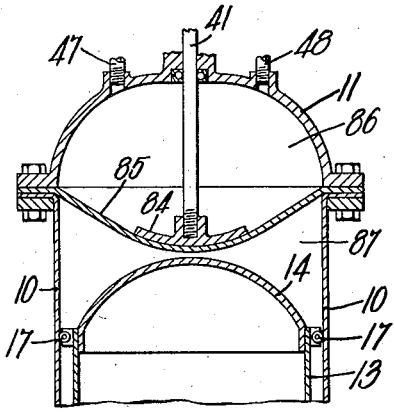
Fig. 6.
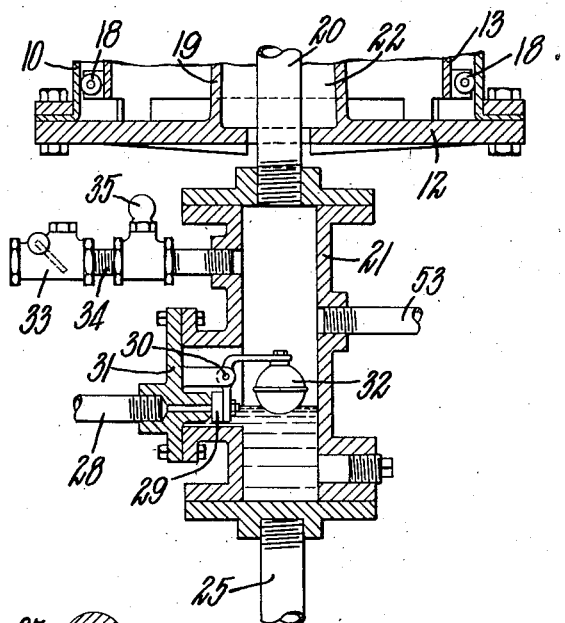
Fig. 7.
Fig. 3.
Fig. 4.
Fig. 5.
Inventor:
Charles H. Eastman,
by Franklin E. Low
Att'y.

Patented Aug. 13, 1935

2,011,476

UNITED STATES PATENT OFFICE 2,011,476

AUTOMATIC FLUID CONTROL AND VACUUM DEVICE

Charles H. Eastman, Boston, Mass., assignor to Eastman Heat Control Corporation, Boston, Mass., a corporation of Massachusetts Application September 12, 1933, Serial No. 689,073

14 Claims. (Cl. 137—153)

This invention relates broadly to an automatic fluid control device and particularly to a combination pressure and vacuum control device.

In certain respects the device of this invention is similar to devices of my invention for which I have obtained United States Letters Patent No. 1,505,381, August 19, 1924 and No. 1,530,485, March 24, 1925, to which reference may be had for a further description of the uses and functions of this type of automatic fluid control device.

The control device of this invention is particularly adapted to be used in connection with an operating instrumentality for fuel oil supply feeds, gas, air, steam, pressure reducing valves, release valves, or any such instrumentality requiring a substantially uniform low pressure, which device when installed requires no attention as it automatically regulates the pressure to an accurate and dependable degree.

The invention more particularly relates to improvements in the above-mentioned patented devices whereby to insure the continuity, accuracy and smoothness of their operation and is especially adaptable to heating systems that are supplied with steam purchased from district heating companies or a central heating plant, and to low-pressure and vacuum heating plants. When steam is purchased a needless waste exists in most cases due to the human equation. The main steam supply valve is hand operated and opened partly. The regulating of this valve is entrusted to an individual whose other duties are numerous. Consequently, the amount of steam delivered to the building, at most times, is either inadequate or in excess of the demand with corresponding dissatisfaction. This condition, with improper control of the steam pressures, or vacuum, not only results in excessive cost of operation but also produces a disagreeable and unsatisfactory atmospheric condition. Since the advent of district heating there has been an urgent demand by consumers and sellers of "purchased steam" for a system of control that will accomplish the following results:—1. Automatically open a control valve thereby admitting sufficient steam to the heating system, at a steady uniform pressure or vacuum, and automatically close this valve when adequate heat has been supplied to meet the requirements, and 2, an automatic, accurate and dependable means for controlling the steam pressure or vacuum, said means being capable of operating above and below atmospheric pressure to maintain a uniform steam pressure or vacuum in the heating system without human equation, despite varying internal conditions or outside weather changes. Briefly, the control device of this invention comprises a closed hollow casing having an expandible and contractible actuating member mounted therein in a manner to divide the interior of the casing into pressure and vacuum compartments. A weighted reciprocatory rod is mounted upon the actuating member and extends outwardly through the casing for connection to an operating instrumentality. Within the pressure compartment beneath the actuating member, a piston is mounted for vertical movement and in certain conditions of operation to lift the actuating member. A liquid seal provided between the piston and casing normally extends upwardly to a predetermined height within the piston. The vacuum compartment is connected by suitable piping with suitable vacuum creating instrumentalities, including the vacuum return line of the steam-heating system and with the low-pressure side of said steam supply main. The fluid, the pressure of which is to be controlled, is piped into the piston above the liquid seal, whereby it functions to move the piston within the pressure compartment of the casing and thereby control the operating instrumentalities.

The object of the invention is to provide a single unitary device embodying therein a mechanism adapted to utilize either pressure or vacuum in its operation and also constructed and arranged to automatically change from pressure to vacuum, and vice versa, without the necessity of anybody being present at the time of said change, thereby eliminating the human equation which is at present required for handling separate devices.

Another object of the invention is to provide a device of the character set forth which can be installed to operate at a predetermined pressure or below atmospheric pressure, said device being simple in its construction and efficient in its operation. In this device if the steam pressure is set at one-half pound, and is changed to vacuum, the same weights will allow a setting predetermined in inches of vacuum, without altering their position.

The invention contemplates in its construction the utilization of certain air vents and check valves positioned in the system as may be required for the purpose of increasing the efficiency of the operation thereof.

The invention consists in an automatic fluid control and vacuum device as set forth in the following specification and particularly as pointed out in the claims thereof.

Referring to the drawings:—

Fig. 2 is an enlarged vertical sectional elevation of the upper portion of the casing of the device including the vacuum compartment.

Fig. 3 is an enlarged vertical sectional elevation illustrating the lower portion of the casing and parts associated therewith.

Fig. 4 is an enlarged detail horizontal sectional view taken approximately on the line 4—4 of Fig. 1.

Fig. 5 is an enlarged vertical sectional view of an air vent, or relief valve, used at several places in the device.

Fig. 6 is a view similar to Fig. 2, but illustrating a modified embodiment of the invention.

Fig. 7 is a view similar to Figs. 2 and 6 illustrating still another modified embodiment of the invention.

Like numerals refer to like parts throughout the several views of the drawings.

Figure 1:
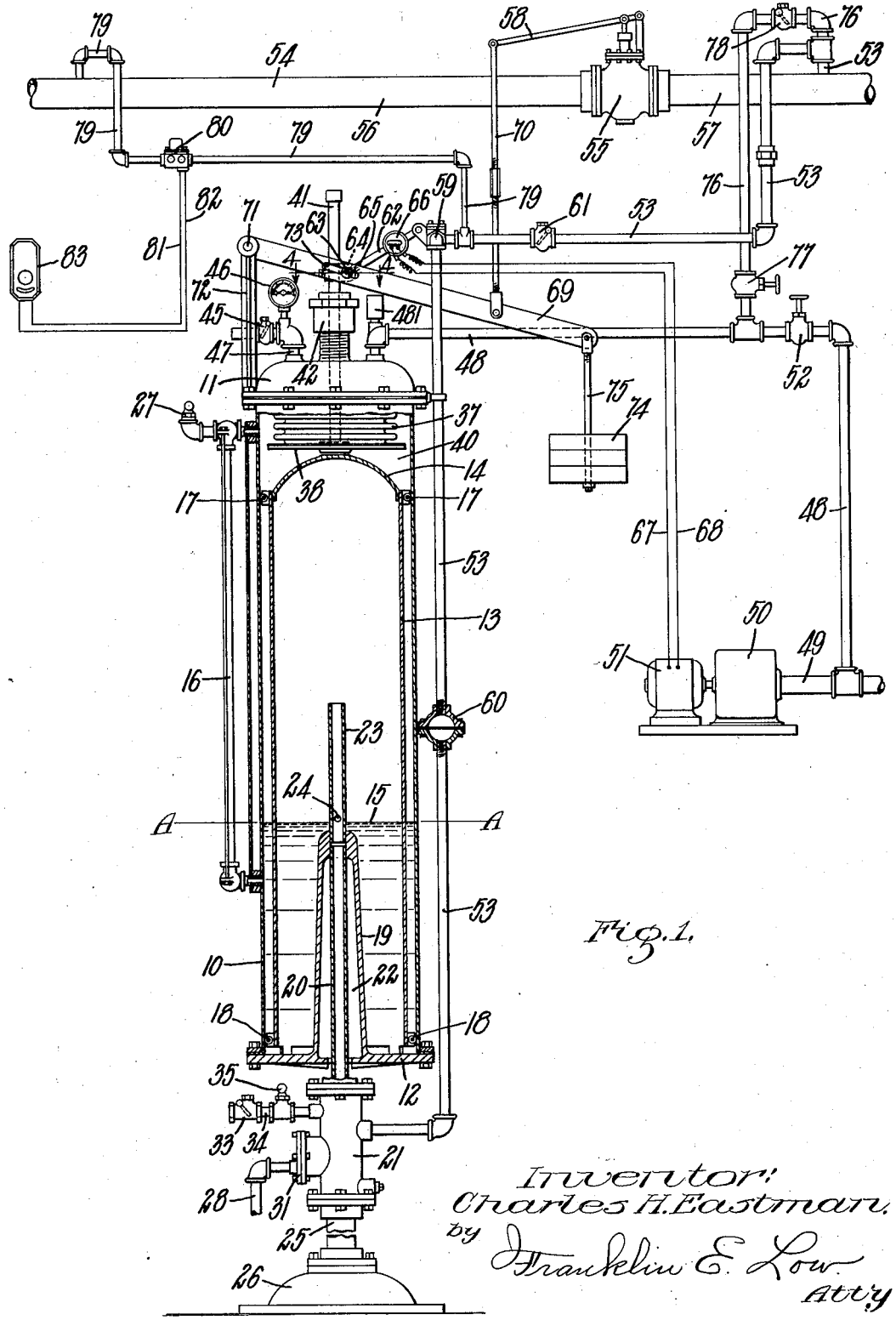
Fig. 1 is a vertical sectional elevation of a control device embodying my invention.

In the drawings, referring particularly to Figs. 1 to 5 inclusive, 10 is a casing preferably cylindrical and closed at its opposite ends by a top 11 and bottom 12. Inside the casing 10 a piston 13 is provided which is open at the bottom and closed by a top 14 fast thereto. A suitable quantity of water or other suitable liquid 15 is provided at the bottom of the casing 10 to constitute a seal between the piston 13 and the casing and this seal normally rises to the level indicated by the line A—A, Fig. 1, both within the piston and in the space between said piston and the casing. The casing 10 is provided with a gage 16 which registers the pressure in the piston in a manner well known to those skilled in the art. The piston 13 is provided with a plurality of anti-friction rolls 17 located adjacent to the top thereof and a plurality of other anti-friction rolls 18 located adjacent to the bottom thereof, all of which are adapted to contact with the interior of the casing 10 and constitute anti-friction guide members for the piston during its reciprocatory movements in the casing.

Projecting upwardly from the bottom member 12 of the casing 10 is a conical standard 19 which projects into the bottom of the piston 13 and terminates at the liquid level. A pipe 20 is mounted at its lower end in a separator 21 and extends from said separator upwardly through an air chamber 22 provided upon the interior of the standard 19 and terminates at its upper extremity in the top portion of said standard. Another pipe 23, which in effect constitutes a continuation of the pipe 20, is mounted in the top portion of the standard 19 in alignment with the pipe 20 and terminates at its upper end within the piston 13 a substantial distance above the normal level of the liquid constituting the seal. The upper extremity of the pipe 23 is open and said pipe is provided with ports 24 which are located just above the upper extremity of the standard 19, whereby the height of the liquid comprising the seal is regulated as at the level A—A.

A standard 25 is secured at the top thereof to the bottom portion of the separator 21 while the bottom portion of said standard is secured to a suitable pedestal 26.

Mounted at the top of the gage 16 and communicating with the interior of the casing 10 through the piping instrumentalities which constitute the liquid gage is a combined filling plug and air vent 27. This member, which is illustrated in detail in Fig. 5, serves to provide a vent for the interior of the casing 10 and when it is removed from its pipe connections to the container, the liquid constituting the seal may be admitted to the interior of the casing through these pipe connections.

The separator 21 has a drain pipe 28 communicating therewith which is utilized as a means for discharging excess condensation which may accumulate in the bottom portion of said separator. A valve 29 is provided for the purpose of permitting this condensation to pass into the drain pipe 28, said valve being pivotally attached at 30 to a cover plate 31 forming a part of said separator. The valve 29 is actuated by means of a float 32 which rises in a well-known manner when the condensation at the bottom of the separator reaches a predetermined level.

A check valve 33 is attached to the separator 21 by means of a pipe 34 and communicates with the chamber provided upon the interior of the separator so that if a vacuum should form in the piston 13 it will be broken by air entering through this valve. An air vent or relief valve 35 is also provided in the pipe connection 34 to the interior of the separator 21 for the purpose of permitting the escape of dead air from said separator and connected passages when initially delivering fluid to the piston to start the operation of the control device.

Mounted in the upper portion of the casing 10 and secured to the top member 11 thereof in any suitable manner is an actuating member 36 embodying therein a bellows 37 of well-known construction and a rigid plate 38, the latter being secured in any suitable manner at the lower extremity of said bellows 37. The space within the bellows 37 and above the plate 38 constitutes a vacuum compartment 39. The adjacent interior portion of the casing 10 upon the exterior of the actuating member 36 and in which the piston 13 reciprocates will be hereinafter referred to as an atmospheric pressure compartment 40.

A rod 41 is rigidly secured to the plate 38 and extends upwardly therefrom through the vacuum compartment 39 and outwardly through the top member 11 of the casing 10, passing through a suitable stuffing box 42 provided in the top member 11. Suitable bearings 43 and 44 are provided mounted as desired upon the top casing member 11 and engaging the rod 41. A check valve 45 and vacuum gage 46 of well-known construction are secured to pipe connections 47 which are secured to the top member 11 of the casing 10 and communicate with the vacuum compartment 39. A pipe 48 is also connected to the top member 11 of the casing 10 and communicates with the vacuum compartment 39 and said pipe is connected in a well-known manner with a return line 49 which leads from the heating instrumentalities of a building as, for example, the radiators thereof to a vacuum pump 50 well known in the art and operated by means of an electric or other motor 51. A hand operated valve 52 is provided for the pipe 48. A valve 48ꞌ is also provided for the pipe 48 adjacent to the top member 11 of the casing 10 in order that air at atmospheric pressure may enter the vacuum compartment 39 at all times when the vacuum creating instrumentalities are not functioning. When, however, the vacuum is again formed in the vacuum compartment the valve 48ꞌ will immediately close.

The pipe connections between the control device of this invention and the steam supply pipe 54 are as follows:—Connected to the separator 21 and communicating with the interior thereof and also with the interior of the piston 13 through pipes 20 and 23 is a steam supply pipe 53. This steam pipe 53 may lead to any suitable source of steam supply such, for example, as a steam main or boiler. In this instance the pipe is illustrated as being connected to a steam supply main 54 having a balance pressure valve 55 of well-known construction provided therefor, thereby dividing said main into a high-pressure side 56 and a low-pressure side 57. The valve 55 is provided with an operating handle 58. The steam pipe 53 extends from the separator 21 upwardly beside the casing 10, and at a point at a level above the top 11 of said casing has a throttle valve 59 of well-known construction inserted therein. At a point in the steam pipe 53 between the throttle valve 59 and separator 21 a strainer 60 of well-known construction is inserted. A check valve 61 is furthermore inserted in the steam pipe 53 between the throttle valve 59 and the low-pressure side 57 of the steam supply main 54.

The throttle valve 59 is actuated by means of a lever 62 which is operatively connected by means of a pin 63 to a collar 64 which, in turn, is adjustably mounted upon the rod 41 of the actuating member 36. The lever 62 is slotted at 65 to receive the pin 63 and permit a relative movement between said lever and pin during the upward and downward movements of the lever. A mercury switch 66 of well-known form is secured to the lever 62 and is electrically connected by means of wires 67 and 68 with the electric motor 51. The reciprocatory movement, therefore, of the rod 41, as hereinafter to be explained, will automatically cause the throttle valve 59 to be actuated and the motor 51 to be energized.

The balance pressure valve 55 is operatively connected to the rod 41 to be actuated thereby through the medium of a lever 69 and adjustable connecting rod 70, the latter operatively connecting the lever 69 with the handle 58 of the pressure valve 55. The lever 69 is pivotally connected at 71 to a bracket 72 which is mounted upon the top casing member 11. The lever 69 is operatively connected to the collar 64 of the rod 41 through the medium of the pin 63 which projects through a slot 73 provided in the lever 69, see Fig. 4. Weights 74 of suitable size and number are suspended from the outer extremity or free end of the lever 69 by means of a rod 75 and the actuating member 36 is "set" to function at any suitable pressure desired or at the vacuum point desired by varying the number of the weights suspended from the outer extremity of the lever 69. In effect a variable tension is imposed upon the actuating member 36 by increasing or decreasing the number of weights utilized.

The vacuum pipe 48 is connected with the low-pressure side 57 of the steam supply main 54 by means of a pipe 76, and a hand-operated valve 77 and automatically actuated check valve 78 are interposed in this pipe 76.

The steam pipe 53 is connected with the high-pressure side 56 of the steam supply main 54 by means of a pipe 79 in which is interposed an automatically actuated solenoid valve 80, the latter being electrically connected by means of wires 81 and 82 with a thermostatically actuated control device or clock mechanism 83 which may be located at any desired location in the building and which may be utilized for causing the solenoid valve to be actuated for the purpose of opening or closing this valve. The pipe 79 is connected to the pipe 53 at a point between the throttle valve 59 and the low-pressure side 57 of the steam supply.

The general operation of the device hereinbefore specifically described, and in particular when such device is operated as a pressure device, is as follows:—Assuming that the hand-actuated valves 52 and 77 of the vacuum control system have been closed and that the actuating member 36 has been "set" to function at a certain predetermined pressure by placing weights 74 in required number upon the rod 75 at the outer extremity of the lever 69, and that liquid such as water has been inserted in the casing 10, through the opening provided by removing the air vent or filling plug 27 until said water reaches the level indicated by the line A—A, and that steam under pressure from the low-pressure side 57 of the steam supply main 54 is introduced to the interior of the piston 13 through the pipe 53, separator 21 and pipes 20 and 23; all condensation of supply fluid is separated and falls, being taken care of by the discharge valve 29. The liquid 15 in the piston 13 will be forced downwardly by the pressure of said steam and will be forced upwardly in the space between the piston 13 and the casing 10. The air which at that time is enclosed between the space between the piston and the casing will pass outwardly from said casing to the atmosphere through the air vent 27. This operation will continue, the piston 13 rising and the liquid between the walls of said piston and said casing also rising, and the liquid inside the piston descending until eventually the top member 14 of the piston will engage the under surface of the plate 38 which constitutes a portion of the actuating member 36. A continued upward movement of the piston 13 will thereafter gradually collapse the bellows 37 of the actuating member 36 and cause the rod 41 to move upwardly carrying with it the lever 69 which is connected to the balance valve 55 and the lever 62 which is connected to the throttle valve 59. The movement of the lever 69, connecting rod 70 and handle 58 of the valve 55 will cause the latter to be actuated to partly close said valve, thereby allowing just enough steam to pass from the high-pressure side 56 of the steam supply main to the low-pressure side 57 thereof to carry steadily and uniformly the pressure at which the control device is "set". At the same time that the balance valve 55 is actuated to reduce the steam pressure admitted to the pipe 53, the throttle valve 59 will be actuated to also regulate the quantity of steam that is permitted to pass therethrough and from thence to the interior of the piston 13. After the piston 13 has risen in the casing 10 to the predetermined pressure for which the device is "set" the piston will remain at this height until the pressure in the separator 21 drops below or rises above the amount which has been predetermined for the particular device under consideration. If the pressure decreases below the set point, the piston will partly drop thereby opening the balance valve wider, thus admitting more steam and causing the piston to return to its set position. If the pressure increases above the set point, the piston will partly rise thereby moving the balance valve towards its closed position thus admitting less steam and causing piston to likewise return to its set position. In this way the set pressure is maintained. Steam is prevented from entering the vacuum compartment 39 by check valve 78 which is closed when pressure is on the system.

If steam is the fluid which is being used and condensation has increased the amount of water in the piston 13 and in the casing 10, the surplus water thus accumulated will overflow through the drain pipe 28 as permitted so to do by the valve 29.

The general operation of the device when operated as a vacuum device is as follows:—At this time the valve 52 or 77 is open and the vacuum pump 50 is functioning in a well-known manner to maintain a pressure below atmospheric throughout the heating system or return lines to traps on radiators, and within the vacuum compartment 39 of the control device. If valve 52 is shut and valve 77 open, vacuum will be carried through the entire heating system. If valve 77 is shut and valve 52 open, vacuum will be carried in return lines only. Steam will be prevented from entering piston 13 by check valve 61 which is held closed by vacuum. If the vacuum pump 50 creates more vacuum than the control device is set to carry, the bellows 37 will start to collapse on account of the difference in pressure exerted on the plate 38, the pressure in vacuum bellows being below atmosphere, and the outside of plate 38 under atmospheric pressure as space between casing 10 and piston 13 is open to atmosphere at all times through air vent 27. As the bellows 37 collapses the rod 41 will start to rise, as hereinbefore mentioned, thereby simultaneously actuating the pressure reducing valve 55 to partially close the same, and also tipping the mercury switch 66 carried by the lever 62 and thereby stopping the motor 51 and the vacuum pump 50 operated thereby. The vacuum pump will remain shut off until the vacuum gradually returns to the pressure for which the control device is set, during which interval the rod 41 will have gradually dropped to a point which will again cause the mercury switch 66 to function to again start the vacuum pump in operation. During the operation of the device as a vacuum device the check valve 61 will prevent air from passing from the pressure pipe 53 into vacuum lines thereby making necessary vacuum, and when the vacuum which is carried within these pipes breaks or drops, the rod 41 will gradually drop and pressure will form closing check 78 and steam will pass through the check valve 61 automatically, thus carrying a steady uniform pressure on the heating main. When the steam pressure drops and vacuum is formed, the valve 61 will close and the valve 78 open.

It will be understood that the vacuum in the heating system is carried to the steam pressure main on the low-pressure side and also to the return main so that if the vacuum is carried only on the return it is governed from that point and if the vacuum is carried throughout the entire system it is governed at a point near the reducing pressure valve.

At night when no steam is in use the solenoid valve 80 is automatically actuated by means of its control device 83 to permit relatively high-pressure steam to be delivered from the high-pressure side 56 of the steam main into the pipe 53 between the throttle valve 59 and the check valve 61. This high-pressure steam will automatically close the check valve 61 and just enough steam will be delivered through the throttle valve 59 to cause the piston 13 to rise and close the balance valve 55 and said valve 55 will remain closed with no steam on its low-pressure side until steam is required in the morning when, by the closing of the solenoid valve in a well-known manner by means of its control device 83, the pressure is removed from the piston 13 and the latter will gradually fall to its normal position, thereby automatically opening the balance valve 55. Steam from the low-pressure side 57 of the steam main will then again be admitted to the piston 13 causing the piston to again rise until the amount of pressure for which the device has been set has been reached. This last-described mechanism functions in exactly the same manner whether the device is used as a pressure or a vacuum device. The check valve 45 functions to relieve the vacuum compartment 39 of any pressure that might accidentally occur therein.

In Fig. 6 I have illustrated a modified embodiment of my invention in which an actuating member 84 is constructed in the form of an expandible and contractible diaphragm 85 which is clamped in any suitable manner between the top 11 of the casing 10 and the main cylindrical portion of said casing. The rod 41 is connected in any suitable manner to this diaphragm 85 and the actuating member 84 functions in exactly the same manner as does the actuating member of the preferred construction, a space 86 above the diaphragm 85 constituting a vacuum compartment and a space 87 within the casing beneath the diaphragm 85 constituting an atmospheric pressure compartment.

In Fig. 7 another modified embodiment of the device is illustrated in which an actuating member 88 is constructed in the form of a corrugated diaphragm 89. The space within the casing above the diaphragm 89 constitutes a vacuum compartment 90 and the space within the casing 10 beneath the diaphragm 89 constitutes an atmospheric pressure compartment 91. In this embodiment of the invention a piston 13 is loosely positioned at the top thereof within a guide member 92 which is carried by the diaphragm 89, and a tubular member 93 projects upwardly from said guide member 92 through the top member 11 of the casing 10 for the purpose of transmitting motion from the diaphragm 89 to the instrumentalities located upon the exterior of the casing. In this structure, furthermore, air at atmospheric pressure enters the pressure compartment 91 through the tube 93 and the air vent 27 utilized in the other embodiments of the invention may be eliminated.

I claim:

1. An automatic fluid control device comprising, in combination, a casing, an expandible and contractible actuating member mounted therein, a reciprocatory member also mounted within said casing independent of said actuating member but adapted to communicate motion thereto, a pressure fluid supply pipe, a valve therefor, means to convey pressure fluid from said supply pipe to said reciprocatory member to actuate the same, a valve for said last-named means, and a member carried by the actuating member and projecting outwardly through the casing and operatively connected to both of said valves, whereby both of the valves may be operated.

2. An automatic fluid control device comprising, in combination, a casing, a bellows mounted in said casing, a reciprocatory member constituting a float also mounted within said casing independent of said bellows but adapted to communicate motion thereto, a pressure fluid supply pipe, a valve therefor, liquid in said casing forming a seal between the casing and float, means to convey pressure fluid from said supply pipe to said reciprocatory member to actuate the same, a valve for said last-named means, and a member carried by said bellows and projecting outwardly through the casing and operatively connected to both of said valves, whereby both of the valves may be operated.

3. An automatic fluid control device comprising, in combination, a casing, a diaphragm mounted in said casing, a reciprocatory member also mounted within said casing in disconnected relation to the diaphragm and adapted to communicate motion to said diaphragm in one direction only, a pressure fluid supply pipe, a valve therefor, means to convey pressure fluid from said supply pipe to said reciprocatory member to actuate the same, a valve for said last-named means, and a member carried by said diaphragm and projecting outwardly through the casing and operatively connected to both of said valves whereby both of the valves may be operated.

4. An automatic fluid control and vacuum device comprising, in combination, a casing, a bellows mounted within said casing and co-operating therewith to form a vacuum compartment, a piston constituting a float within the casing independent of said bellows but adapted to communicate motion to said bellows, liquid in said casing forming a seal between the casing and piston, means to convey pressure fluid to said piston to actuate the same and thereby contract the bellows, a vacuum pump to reduce the pressure within said vacuum compartment below atmospheric, whereby the bellows will contract independently of the action of the piston, means to impose a variable tension upon said bellows, and a member carried by the bellows and projecting outwardly through the casing, whereby said vacuum pump and other instrumentalities upon the exterior of the casing may be operated.

5. An automatic fluid control and vacuum device comprising, in combination, a casing, an expandible and contractible actuating member within said casing and co-operating therewith to form a vacuum compartment, a reciprocatory member constituting a float within the casing independent of said actuating member but adapted to communicate motion thereto, liquid in said casing forming a seal between the casing and reciprocatory member, means to convey pressure fluid to said reciprocatory member to actuate the same, an electrically actuated vacuum pump to reduce the pressure within the vacuum compartment below atmospheric, whereby the actuating member will function independently of the action of the reciprocatory member, and a member carried by the actuating member and projecting outwardly through the casing and operatively connected to a switch for said vacuum pump whereby the operation of the latter is controlled.

6. An automatic fluid control and vacuum device comprising, in combination, a closed hollow casing, an expandible and contractible actuating member within said casing dividing the interior thereof into pressure and vacuum compartments, a piston in said pressure compartment independent of said actuating member but adapted to communicate motion thereto, liquid in said casing forming a seal between the casing and piston, means to convey pressure fluid to the interior of said piston above the liquid therein, a vacuum pump to reduce the pressure within the vacuum compartment below atmospheric, whereby the actuating member will function independently of the action of the piston, an electric switch for said vacuum pump, and a member carried by the actuating member and projecting outwardly through the casing and operatively connected to said switch whereby the vacuum pump and other instrumentalities upon the exterior of the casing may be operated.

7. An automatic fluid control and vacuum device comprising, in combination, a closed hollow casing, an expandible and contractible actuating member within said casing dividing the same into pressure and vacuum compartments, a piston in said pressure compartment independent of said actuating member but adapted to communicate motion thereto, liquid in said casing forming a seal between the casing and piston, means to convey fluid under pressure to the interior of said piston above the liquid therein, means including a vacuum pump to reduce the pressure within the vacuum compartment below atmospheric, whereby the actuating member will function independently of the action of the piston, a rod carried by the actuating member and projecting outwardly through the casing and operatively connected to said vacuum pump, whereby the operation of the latter is controlled, and other means connected to said rod for controlling the flow of said pressure fluid to the piston.

8. An automatic fluid control and vacuum device comprising, in combination, a closed hollow casing, a bellows within said casing and co-operating therewith to form pressure and vacuum compartments, a piston constituting a float in said pressure compartment independent of the bellows but adapted to collapse said bellows, liquid in said casing forming a seal between the casing and piston, means to convey pressure fluid to the interior of said piston above the liquid therein, an electrically actuated vacuum pump to reduce the pressure within the bellows below atmospheric, a switch therefor, means to admit air at atmospheric pressure to the vacuum compartment when operating under pressure and to exclude said air when operating under vacuum, and a member carried by the bellows and projecting outwardly through the casing and operatively connected to said switch, whereby the operation of the vacuum pump is controlled.

9. An automatic fluid control and vacuum device comprising, in combination, a closed hollow casing, a diaphragm within said casing and co-operating therewith to form pressure and vacuum compartments, a piston constituting a float in said casing independent of but adapted to collapse said diaphragm, liquid in said casing forming a seal between the casing and piston, means to convey pressure fluid to the interior of said piston above the liquid therein, means including a vacuum pump to reduce the pressure within the vacuum compartment below atmospheric, whereby the diaphragm is actuated independently of the action of the piston, a member carried by the diaphragm and projecting outwardly through the casing and operatively connected to said vacuum pump, whereby the operation of the latter is controlled, and other means actuated by said diaphragm for controlling the flow of pressure fluid to the piston.

10. An automatic fluid control and vacuum device comprising, in combination, a closed hollow casing, a bellows within said casing and co-operating therewith to form pressure and vacuum compartments, a piston constituting a float in said pressure compartment independent of but adapted to collapse said bellows, liquid in said casing forming a seal between the casing and piston, means to convey pressure fluid to the interior of said piston above the liquid therein, a vacuum pump to reduce the pressure within the bellows below atmospheric, whereby said bellows is actuated independently of the action of the piston, a member carried by the bellows and projecting outwardly through the casing and operatively connected to said vacuum pump, whereby the operation of the latter is controlled, other means actuated by said bellows for controlling the flow of pressure fluid to the piston, and means to place a variable tension on said bellows whereby the latter will function at variable pressures.

11. An automatic fluid control and vacuum device comprising, in combination, a casing, an expandible and contractible actuating member mounted within said casing and co-operating therewith to form pressure and vacuum compartments, a piston within said pressure compartment adapted to communicate motion to said actuating member, means to convey pressure fluid to said piston to actuate the same, a throttle valve for said last-named means having an operating lever embodied therein, means to reduce the pressure within the vacuum compartment below atmospheric, a switch mounted upon said operating lever and electrically connected to said pressure reducing instrumentalities, whereby the latter are actuated automatically by the movement of the operating lever, and a member carried by the actuating member and projecting outwardly through the casing and operatively connected to said lever whereby the operation of the pressure reducing instrumentalities is controlled.

12. An automatic fluid control and vacuum device comprising, in combination, a casing, an expandible and contractible actuating member mounted within said casing and co-operating therewith to form pressure and vacuum compartments, a piston within said casing adapted to communicate motion to said actuating member, a pressure fluid supply pipe, a balance valve for said pipe dividing the same into a high-pressure side and low-pressure side, means to convey low-pressure fluid from said supply pipe to said piston to actuate the same, a throttle valve for said last-named means having an operating lever embodied therein, means to reduce the pressure in the vacuum compartment below atmospheric, a switch mounted upon said operating lever and electrically connected to said pressure reducing instrumentalities, whereby the latter are actuated automatically by the movement of the operating lever, and a member carried by the actuating member and projecting outwardly through the casing and operatively connected to said operating lever and to said balance valve whereby the operation of the pressure reducing instrumentalities and the flow of pressure fluid through the supply pipe is controlled.

13. An automatic fluid control and vacuum device comprising, in combination, a closed hollow casing, a bellows within said casing and co-operating therewith to form pressure and vacuum compartments, a piston in said pressure compartment adapted to collapse said bellows, liquid in said casing forming a seal between the casing and piston, a pressure fluid supply pipe, a balance valve for said pipe dividing the same into a high-pressure side and a low-pressure side, means to convey low-pressure fluid from said supply pipe to the interior of said piston above the level of the liquid therein, a throttle valve for said last-named means having an operating lever embodied therein, means to reduce the pressure within the bellows below atmospheric, a switch mounted upon said operating lever and electrically connected to said pressure reducing instrumentalities, whereby the latter are actuated automatically by the movement of the operating lever, a member carried by the bellows and projecting outwardly through the casing and operatively connected to said operating lever and to said balance valve, whereby the operation of the pressure reducing instrumentalities and the flow of pressure fluid through the supply pipe is controlled, and means to impose a variable tension upon the the bellows whereby the latter will function at variable pressures.

14. An automatic fluid control and vacuum device comprising, in combination, a closed hollow casing, a bellows within said casing and co-operating therewith to form pressure and vacuum compartments, a piston in said pressure compartment adapted to collapse said bellows, liquid in said casing forming a seal between the casing and piston, a pressure fluid supply pipe, a balance valve for said pipe dividing the same into a high-pressure side and a low-pressure side, means to convey low-pressure fluid from said supply pipe to the interior of said piston above the level of the liquid therein, a throttle valve for said last-named means having an operating lever embodied therein, means to reduce the pressure within the bellows below atmospheric, a switch mounted upon said operating lever and electrically connected to said pressure reducing instrumentalities, whereby the latter are actuated automatically by the movement of the operating lever, a member carried by the bellows and projecting outwardly through the casing and operatively connected to said operating lever and to said balance valve, whereby the operation of the pressure reducing instrumentalities and the flow of pressure fluid through the supply pipe is controlled, means to impose a variable tension upon the bellows whereby the latter will function at variable pressures, means to convey high pressure fluid from the supply pipe to the piston, a valve therefor, and means to automatically control the actuation of said last-named valve whereby the piston is actuated to open and close the balance valve at predetermined times.

CHARLES H. EASTMAN.